United States Patent [19]

Buckler et al.

[11] 3,735,680

[45] May 29, 1973

[54] CONTAINER FOR FILM UNITS AND FLASH ILLUMINATION DEVICES

[75] Inventors: Sheldon A. Buckler, Lincoln; David P. Kennedy, Cambridge; Kenneth S. Norland, Belmont, all of Mass.

[73] Assignee: Polaroid Corporation, Cambridge, Mass.

[22] Filed: Jan. 10, 1972

[21] Appl. No.: 216,542

[52] U.S. Cl. ...................95/11 L, 95/19, 240/1.3
[51] Int. Cl. ...................G03b 15/02, G03b 19/10
[58] Field of Search.................95/11 L, 11 R, 19, 95/13; 240/37.1, 1.3; 221/143

[56] References Cited

UNITED STATES PATENTS

| | | | |
|---|---|---|---|
| 3,587,452 | 6/1971 | Biber | 95/11 R |
| 3,094,284 | 6/1963 | Hehl | 240/1.3 |
| 3,107,862 | 10/1963 | Moore et al. | 240/1.3 |

*Primary Examiner*—Robert P. Greiner
*Attorney*—Robert M. Ford et al.

[57] ABSTRACT

A photographic film assemblage including a container having a wall with an aperture therein through which film units contained within the container may be exposed; a plurality of film units are stacked within the container with the photosensitive areas in alignment with the aperture. Additionally, a plurality of flash illumination devices are also contained within the container.

8 Claims, 3 Drawing Figures

CONTAINER FOR FILM UNITS AND FLASH ILLUMINATION DEVICES

BACKGROUND OF THE INVENTION

The present invention is concerned with improvements in photographic film assemblages or packs of the type including a container and a plurality of photosensitive elements or film units disposed therein, adapted to be exposed, in sequence, within the container and withdrawn therefrom following exposure. The container is provided with an elongated opening in one end thereof, dimensioned to permit the passage of the film units therethrough and a forward wall having a light-transmitting section. The film units are stacked within the container with the leading end of each film unit positioned adjacent an end wall and with a forwardmost film unit positioned with its photosensitive surface facing in the direction of said forward wall in position for exposure to light transmitted through said light-transmitting section and its end in alignment with said elongated opening.

Examples of such film packs may be found in U. S. Pat. Nos. 3,595,661 issued July 27, 1971; 3,550,515 issued Dec. 29, 1970; 3,604,329 issued Sept. 14, 1971; 3,433,636 issued Mar. 18, 1969; and 3,294,538 issued Dec. 27, 1966.

Copending application Ser. No. 216,467, filed Jan. 10, 1972 concurrently herewith discloses flash illumination devices formed of transparent sheet plastic wherein a pair of opposed walls are marginally secured together to provide a cavity for retaining pyrotechnic material. The aforementioned copending application also discloses the employment of the flash illumination devices in the form of a continuous strip joined by fold panels or perforated edge portions so that the devices may be fed from a cartridge or container as needed into a reflector or other suitable camera mounted flash attachment. As described in the above-mentioned copending application, a flash illumination device may be advanced into the position required for flashing, a film unit exposed simultaneous with the ignition of the flash lamp and the exhausted flash device removed and discarded while at the same time moving a new flash illumination device into the position required for flashing.

A novel photographic film assemblage has now been found which includes both a plurality of film units and a plurality of flash illumination devices.

SUMMARY OF THE INVENTION

The present invention is directed to a photographic film assemblage including a container retaining therein a plurality of film units which includes a wall having a light-transmitting section therein with the photosensitive areas of the film units located in alignment with the light-transmitting section, and which further includes a plurality of flash illumination devices adapted to be moved into position for ignition. The flash illumination device comprises a flexible, transparent sheet plastic marginally secured to define a pyrotechnic retaining cavity therein and including, as a pyrotechnic material, a combustible material and a solid oxidant. In one embodiment of the present invention, a plurality of flash illumination devices are secured together in strip form and are advanced into position for ignition substantially simultaneously with the positioning of a film unit next adjacent the light-transmitting section of the container. In a preferred embodiment, the container includes a second compartment adjacent the rear wall of the container retaining the flash illumination devices therein.

DETAILED DESCRIPTION OF THE INVENTION

Figure 1:
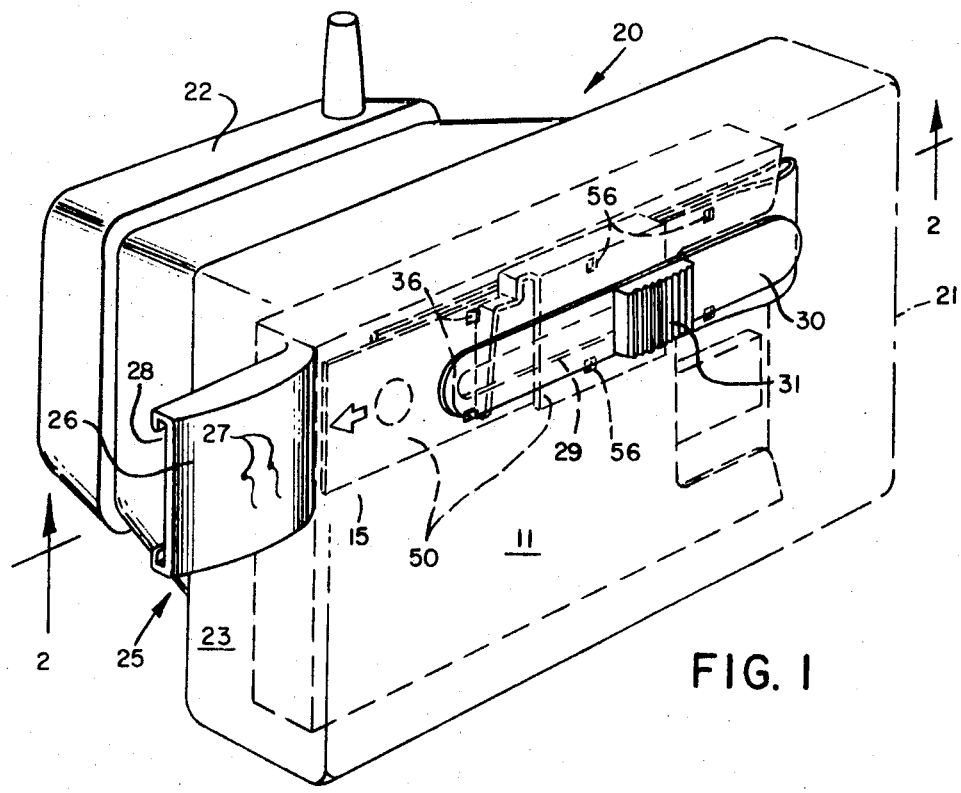
FIG. 1 is a perspective view partly in section showing a photographic assemblage embodying the film pack of the present invention.
Figure 2:
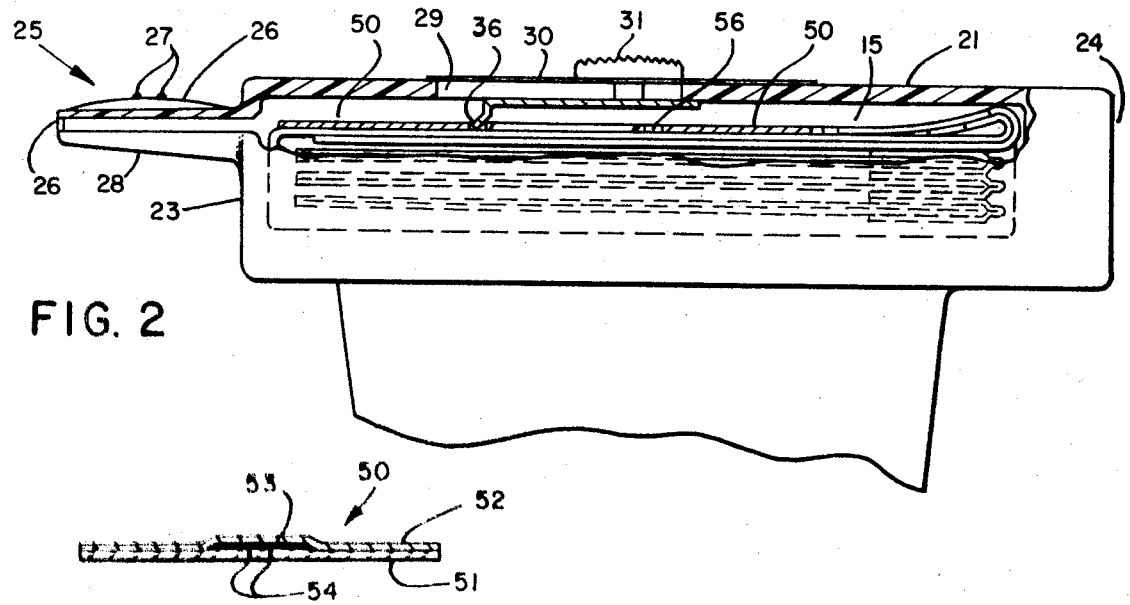
FIG. 2 is an elevational view partly in section showing the film pack of the present invention taken along lines 2—2 of FIG. 1.
Figure 3:
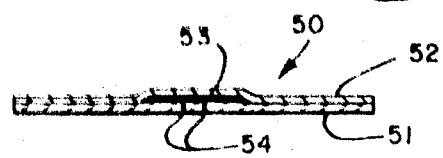
FIG. 3 is a cross section of a flash illumination device employed in the present invention.

The photographic apparatus and process of the invention find particular utility in the treatment of photographic film assemblages of the type including all of the materials required to produce a finished photographic print, preferably in full color, and including a photosensitive image-recording element adapted to be exposed to produce an image; a second or image-receiving element adapted to be superposed with the photosensitive element at least during processing to aid in the distribution of a viscous processing liquid in contact with the exposed photosensitive element and preferably to support a visible image formed by diffusion transfer; and a rupturable container of viscous processing liquid adapted, when distributed in contact with the exposed photosensitive element, to produce a positive image by a process in which image-forming substances are transferred by diffusion from an exposed photosensitive stratum to an image-receptive stratum. Film assemblages of this type may take a number of different forms including, for example, separate photosensitive and second sheets adapted to produce a single print or a plurality of prints; individual film units each including a pair of layers or sheets coupled with or secured to one another in face-to-face relation and adapted to be exposed and processed to produce a single print. The processing liquid may be supplied in a rupturable container coupled with one or both elements and adapted to be moved together with the superposed elements between the pressure-applying members; or it may be supplied from a separate source and dispensed between the elements for subsequent spreading in a thin layer during movement of the elements between the pressure-applying members.

The camera and process embodying the present invention are especially adapted for the treatment of photographic film units of the type shown and described, for example, in U. S. Pat. of Edwin H. Land, No. 3,615,539, issued Oct. 16, 1971. A typical film unit of this type includes all of the materials and the reagents required to produce a full color photographic print by a process such as disclosed in U. S. Pat. No. 2,903,606, issued May 9, 1961, in the name of Howard G. Rogers, This patent discloses a photosensitive element including a silver halide emulsion and a dye developer, that is, a dye which is a silver halide developing agent; a second or image-receiving element including an image-receptive layer of a dyeable material; and a processing liquid in which the dye developer is soluble. The photosensitive and image-receiving elements are superposed with the emulsion and image-receptive layers in face-to-face relation and the processing liquid is distributed in a uniform layer of predetermined thickness between and in contact therewith for permeation into the photosensitive layer where it initiates development of exposed silver halide. The dye developer is immobilized or precipitated in exposed areas as a consequence of development while in unexposed areas and partially exposed areas of the emulsion the dye developer remains unreacted and diffusable thereby providing an imagewise distribution of unoxidized dye developer which is transferred, at least in part, by diffusion to the image-receptive layer without altering the imagewise distribution of the dye developer, to form a reversed or positive color image of the developed latent image in the emulsion. Multicolor transfer images are obtained utilizing dye developers, for example, by employing an integral multilayer photosensitive element such as illustrated in FIG. 9 of the 2,983,606 patent, including at least two selectively sensitized overlying photosensitive strata on a single support. A typical photosensitive element of this type comprises a support carrying a red sensitive silver halide emulsion stratum, a green sensitive silver halide emulsion stratum and a blue sensitive silver halide emulsion stratum, each emulsion having associated therewith, respectively, a cyan dye developer, a magenta dye developer and a yellow dye developer. Each set of silver halide emulsions and associated dye developer strata may be separated from other sets by interlayers formed, for example, of gelatin or polyvinyl alcohol. In the example given, the dye developers are selected for their ability to provide colors useful in producing a full color image by a subtractive process and may be incorporated in the respective silver halide emulsion with which they are associated or in a separate layer behind the respective silver halide emulsion.

The present invention is directed to a photographic film assemblage or pack which retains therein a plurality of film units and a plurality of flash illumination devices. The present invention contemplates the employment of the film pack with a camera to provide in one operation the loading of the camera with film units and flash illumination devices. Thus, in the present invention, the problem of separately obtaining and storing flash bulbs or flash cubes as well as film packs is obviated and a flash illumination device is always available if such is required. Thus, in one operation, the camera can be readied for a flash picture by providing a film unit for exposure and a flash illumination device to provide the desired illumination, thereby obviating the problem of storing and transporting flash illumination devices separately.

In one embodiment it is contemplated that one flash device will be ignited for each film unit exposed, whether or not specific ambient exposure conditions require that degree of illumination. Alternatively, the ignition means may be controlled manually or automatically to prevent ignition if ambient exposure conditions do not require the illumination provided by the flash device.

The flash devices are preferably provided in the form of a strip separably joining together a plurality of flash devices. Alternatively, single flash devices may be stored in the container in a cartridge arrangement which permits the ready insertion of single units into the position for ignition.

The above-mentioned patents referring to the various film packs described manual and mechanical means for removing an exposed film unit from the exposure mode through a processing station and thence its removal from the camera housing. In the present invention, the flash illumination devices may also be inserted into the flash location manually or mechanically. For example, in one embodiment the film pack may be provided with a leader attached to the leading end of the flash illumination device strip so that the first device may be moved into the flash location prior to exposure of the first film unit. As each film unit is exposed and removed from the camera, the leading end of the exhausted flash device may be gripped manually and pulled from the flash location, drawing with it an unexploded flash device into position to be ignited. Perforations or a cutter bar at the flash ignition location would permit the severance of the exhausted device from the remainder of the strip.

To avoid the inadvertent failure to advance a fresh flash illumination device into the ignition mode, it is preferred that the advancement of a flash illumination device into the ignition mode be coupled with the positioning of a fresh film unit into the exposure position, for example, the act of drawing an exposed film unit from the camera to actuate a gear train which would advance a fresh flash illumination device into position for ignition. In a preferred embodiment, however, motorized means are employed for advancing a flash illumination device into position, as well as removing an exposed film unit from the exposure position and the camera.

DETAILED DESCRIPTION OF THE DRAWINGS

Referring now to the drawings, film assemblage 11, containing a plurality of film units (not shown), also includes a compartment 15 on the rear wall having disposed therein a plurality of flash illumination devices 50. In the drawing, there is shown a strip of eight flash illumination devices separably secured together with the strip folded upon itself to occupy a minimum of space in the housing.

A camera of the type adapted to employ the film assemblage for exposing and processing the film units thereof is illustrated in FIG. 1 as comprising housing 20 including forward section 22 which includes a conventional lens, shutter assembly and exposure controls, rear section 21 for holding and enclosing film assemblage 11, first side wall 23 including flash position 25 and second side wall 24 having an aperture therein for the removal of an exposed film unit.

A flash device 50 is composed of first wall 51 marginally secured to second wall 52 defining a cavity 53 retaining a pyrotechnic material therein. Terminals 54 provide means for making electrical contact with the pyrotechnic material.

A rear section 21 of the camera includes a slot 29 adjacent and substantially parallel to the strip of flash illumination devices 50. Button 31 extends through slot 29 and is secured to plate 30 which is slidably mounted on the interior of wall 21. Secured to plate 30 are engaging means 36 which are adapted to engage perforations 56 in the flash device strip. Thus, to move a flash illumination device into position for ignition, button 31 is manually moved in the direction away from the flash position 25 and then moved towards the flash position 25 whereby engaging means 36 engage perforations 56, carrying a flash illumination device along in the same direction as the motion of plate 30, depositing the flash illumination device in flash position 25 ready to be ignited when the shutter is depressed for the taking of the picture. The flash position 25 is composed of reflector 26 and open end 28 which is opposite reflector 26 towards the front of the camera. Reflector 26 includes a pair of terminals 27 through which an electrical current passes in response to actuation of the camera's shutter mechanism and which are adapted to contact and coact with terminals 54 on flash illumination device 50 to ignite the pyrotechnic mix. The outermost end of flash position 25 is open to permit withdrawal of exhausted film units.

Upon the completion of the exposure of a film unit, the withdrawal of the exposed film unit from the camera automatically positions a new film unit for exposure. A new flash illumination device is positioned by manually imparting the above-described reciprocating motion to button 31 advancing a single flash illumination device into position on each back and forward motion of button 31. The exhausted flash illumination device may be detached from the remainder of the strip by tearing or by positioning a cutting edge on flash position 25. Preferably, the strip is perforated for easy detachment and removal.

It should be understood that motorized or other automatic advancing means may be employed to position a flash illumination device in the flash position. For example, the engaging means 36 mounted on plate 30 may be advanced automatically in response to the action of removing an exposed film unit from the film pack or by a separate motorized system actuated by the operator after each exposure.

What is claimed is:

1. A photographic film assemblage comprising, in combination: a plurality of film units; a plurality of flash illumination devices, said flash illumination devices comprising flexible, transparent sheet plastic marginally secured together to provide a pyrotechnic material retaining cavity and a pyrotechnic material retained therein comprising a combustible material and a solid oxidant; a container housing said film units and said flash illumination devices, said container having a wall including a light transmitting area for admitting light into said container to expose said film units; said container having egress means through which said film units and said flash illumination devices are adapted to be advanced individually.

2. An assemblage as defined in claim 1 wherein said flash illumination devices are disposed in a strip in a compartment of said container separated from said film units.

3. An assemblage as defined in claim 1 wherein said flash illumination devices are adapted to be withdrawn from a slot in said container on a side of said container opposite the slot through which the film units are withdrawn.

4. An assemblage as defined in claim 2 wherein said strip includes perforations intermediate each of said flash illumination devices.

5. A photographic apparatus for use with a film assemblage of the type including a plurality of film units; a plurality of flash illumination devices disposed in strip form; a container housing said film units and said flash illumination devices, said container having a wall including a light-transmitting area for admitting light into said container to expose said film units; and first egress means in said container through which said film units are adapted to be advanced individually; and second egress means through which said flash illumination devices are adapted to be withdrawn sequentially from said container, said apparatus including means for engaging said flash illumination devices individually and in sequence and advancing said flash illumination device through said second egress means; and flash assembly means adapted to receive and position a flash illumination device so as to select one of said flash illumination devices for ignition.

6. An apparatus as defined in claim 5 wherein said flash assembly means include ignition means adapted to coact with said positioned flash illumination devices to ignite said pyrotechnic mix.

7. An apparatus as defined in claim 5 wherein said strip is perforated intermediate each of said flash illumination devices and which further includes engaging and advancing means actuable to engage said perforations and advance said illumination devices.

8. An apparatus as defined in claim 7 wherein said engaging and advancing means are adapted to be manually operated.

* * * * *